June 2, 1970     G. A. D. GORDON     3,515,942
ELECTRIC CIRCUIT ARRANGEMENTS PROVIDING
EARTH LEAKAGE PROTECTION Filed Nov. 17, 1967     4 Sheets-Sheet 1

Inventor:
George Andrew Douglas Gordon
By Baldwin Wight Diller & Brown, Attorneys United States Patent Office 3,515,942
Patented June 2, 1970

3,515,942
ELECTRICAL CIRCUIT ARRANGEMENTS PROVIDING EARTH LEAKAGE PROTECTION
George Andrew Douglas Gordon, Friston House, 25 Church Road, Richmond, Surrey, England
Filed Nov. 17, 1967, Ser. No. 683,845
Claims priority, application Great Britain, Oct. 25, 1967, 48,394/67
Int. Cl. H02h 1/02
U.S. Cl. 317—18
21 Claims

ABSTRACT OF THE DISCLOSURE

A protective circuit for interrupting the supply to the primary circuit of a transformer when earth leakage occurs on the secondary side. When earth leakage occurs, the voltage developed across an impedance connected between earth and the secondary winding of the transformer is rectified and used to control the current through a relay. The relay may be controlled by a transistor bi-stable device, and the relay may control a pair of silicon controlled rectifiers in the primary circuit of the transformer.

---

This invention relates to electrical circuit arrangements of the kind which include a transformer arranged to supply current to a load.

The invention is particularly applicable to arrangements in which the transformer is used to increase the voltage of the supply and to arrangements in which the transformer is used to isolate the load from the supply. One example of the first type of use is in the supply of electric current to high-voltage electric discharge lamps, for example, neon lamps of the kind used particularly in illuminated signs. One example of the second type of use is the supply of electric current to apparatus such as hand-operated electric tools from which the user might receive a dangerous electric shock if the apparatus were connected directly to a mains supply having one of its terminals substantially at earth potential.

In installations of the kind referred to above there is the danger that a fire hazard or danger of shock to operating personnel may occur as a result of earth leakage on the secondary side of the transformer since even in dangerous conditions the current on the primary side of the transformer may be insufficient to operate any protective devices, such as fuses or circuit breakers provided to interrupt the primary circuit in the event of overload.

It is an object of the invention to provide a protective circuit to interrupt the supply to the primary circuit of the transformer when earth leakage occurs on the secondary side.

From one aspect the invention consists in a circuit arrangement including a load connected to the secondary winding of a transformer, reactive impedance means connected between said secondary winding and earth, means for rectifying any voltage developed across said impedance means as a result of earth leakage current from the secondary circuit of said transformer, a relay having contacts which control the supply to the primary circuit of said transformer, and means for controlling the current through the, or an, energising coil of said relay in dependence on the output of said rectifying means so that said relay interrupts the supply to said primary circuit.

In some instances, it may be preferable for the relay to interrupt said supply only if the leakage current exceeds the predetermined value for a predetermined period of time.

Preferably, the relay contacts are normally open and the relay is energised to close the contacts so long as the leakage current is below a predetermined value. In one arrangement, the energising current is supplied by a subsidiary transformer through amplifying means such as a thermionic valve or a transistor controlled by an electrical quantity whose magnitude depends on the value of the leakage current. In the case in which the amplifying means comprise a thermionic valve, any voltage developed across the impedance means as a result of earth leakage current is applied to the control grid of the valve through a rectifier so directed that it applies a negative voltage to the grid when there is earth leakage, this negative voltage being sufficient to reduce the current through the relay below the maintaining value when the earth leakage current exceeds the predetermined value. However, in general, it is preferred to arrange the valve circuit so that the valve normally passes just too little current to operate a relay in its anode circuit and to derive a positive potential from any earth leakage current to increase the valve current and operate the relay. This enables the earth leakage current required to switch off the apparatus to be set in more accurately than when the earth leakage current is used to produce a potential which decreases the current through the valve. The reason for this is that the operating current of a relay is much more constant than the maintaining current. In most cases, however, the design of a circuit operating in this way will involve the use of either more than one relay or a multi-contact relay with more than one operating coil.

In one embodiment of the invention the means for controlling the current through the energising coil of the relay consist of, or include, a bi-stable device incorporating at least one transistor. In this case, the relay preferably controls a pair of semi-conductor switches such, for example, as silicon controlled rectifiers in the primary circuit of the transformer.

Methods of performing the invention will now be described with reference to the accompanying drawings in which each figure is a circuit diagram of a different embodiment of the invention.

Figure 1:
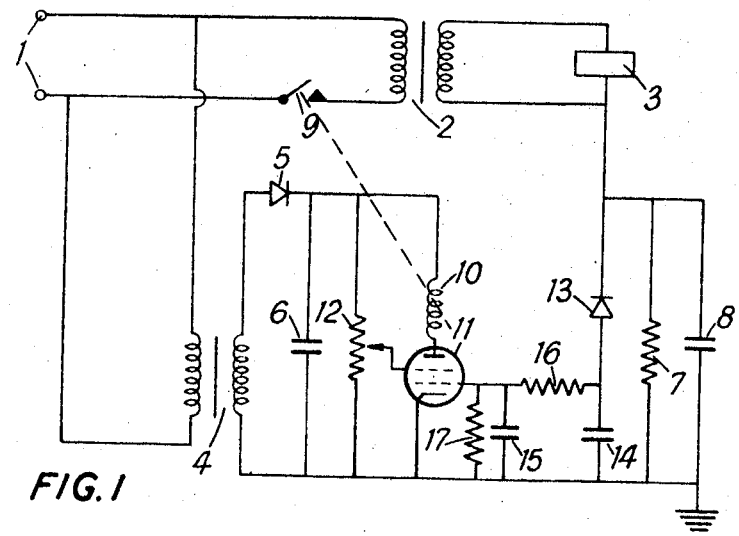
FIG. 1 is a schematic diagram of one embodiment of the invention which includes a pair of relay contacts arranged to be opened and closed by a relay winding in the plate circuit of a thermionic valve the conduction of which is controlled by a voltage input related to leakage current.

In all the figures of the accompanying drawings the reference numeral 1 indicates a pair of terminals connected to a mains supply; reference numeral 2 indicates a transformer; reference numeral 3 indicates a load connected to the secondary of the transformer 2; and reference numeral 4 indicates a subsidiary transformer providing a power supply for the amplifying means through a rectifier 5 and a reservoir capacitor 6.

In the circuit arrangement illustrated in FIG. 1 the reactive impedance means consist of a resistor 7 and a capacitor 8 connected in parallel between one end of the secondary winding of the transformer 2 and earth. The relay includes contacts 9 in the primary circuit of the transformer 2 and an energising coil 10 in the anode circuit of a screen grid thermionic valve 11. The cathode of the valve 11 is connected to earth and the screen grid is connected to the slider of a potentiometer 12 connected across the reservoir 6. Any voltage developed across the resistor 7 and the capacitor 8 as a result of earth leakage on the secondary side of the transformer 2 is applied to the control grid of the thermionic valve 11 through a rectifier 13 and a time delay circuit comprising capacitors 14 and 15 and a resistor 16. A resistor 17 is connected between the grid of the valve 11 and earth to ensure that the grid is at earth potential in the absence of leakage current.

In use, the potentiometer 12 is adjusted so that, when the mains supply is connected to the terminals 1, the valve 11 will normally pass sufficient current to operate the relay 10 and thus connect the load 3 to the mains supply through the transformer 2. A short pulse will appear across the resistor 7 and the capacitor 8 when the relay contacts 9 close but owing to the time constant of the time delay circuit constituted by the elements 14, 15 and 16, this pulse will not be effective to de-energise the relay. If, however, any significant earth leakage occurs a continuing alternating potential is developed across the resistor 7 and as a result a negative potential is applied by the rectifier 13 to the control grid of the valve 11. The value of the rectified voltage rises slowly until it is sufficient to reduce the current through the relay coil 10 below the value necessary to hold the relay operated. As a result, the primary circuit of the transformer 2 is interrupted and the alternating potential across the resistor 7 also disappears. The capacitor 15 discharges through the resistor 17 and the current through the valve 11 rise again until it is sufficient to re-operate the relay. As a result, current, is against supplied to the load 3 and the cycle is repeated. The slow cycle of switching the load on and off will act as an indication of a fault and the ratio of the "on" periods to the "off" periods is an indication of the value of the leakage current. By selecting suitable values for the components the "off" periods can be made long enough to prevent any dangerous heating by the leaking current. This embodiment of the invention may be used, for example, in connection with the supply of current to a high-voltage electric discharge lamp in order to reduce the risk of the fire but would not be suitable, for example, for supplying current to a manual electric tool in order to reduce the risk of electric shock to the operator.

Figure 2:
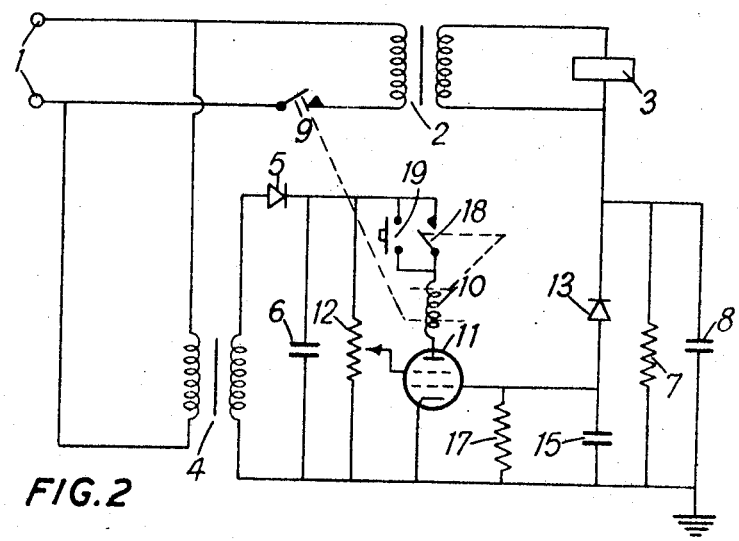
FIG. 2 is a schematic diagram of another embodiment of the invention which includes a start switch.

The circuit arrangement illustrated in FIG. 2 is similar to that illustrated in FIG. 1 that the reactive impedance means again consist of a resistor 7 and a capacitor 8 connected in parallel between one end of the secondary winding of the transformer 2 and earth. Further, the circuit again includes a screen grid thermionic valve 11 having the energising coil 10 of a relay in its anode circuit. The cathode of the valve 11 is connected to earth and the screen grid is connected to the slider of a potentiometer 12. In this instance, the secondary winding of the transformer 2 is connected directly to the control grid of the valve 11 through the rectifier 13. Again, a resistor 17 and a capacitor 15 are connected between the control grid of the valve and earth.

In addition to the contacts 9 in the primary circuit of the transformer 2 the relay is provided with a second pair of normal open contacts 18 connected in series with the energising coil 10 in the anode circuit of the valve 11. A manually operable switch 19 is connected in parallel with the contacts 18 so that these contacts can be temporarily short-circuited by actuation of a push button. To connect the load to the lamp the push button is actuated with the result that current flows through the energising coil 10 and closes the contacts 9 and 18. Normally, the relay is held by closure of the contacts 18 but, if leakage current occurs, the voltage applied through the rectifier 13 to the control grid of the valve 11 will become sufficiently negative to reduce the relay energising current so that it releases and opens both the contacts 9 and 18. Because of the series connection of the contacts 18 the relay will not reclose as in the embodiment illustrated in FIG. 1. Thus, in this embodiment the delay circuit between the rectifier 13 and the control grid of the valve 11 is unnecessary and this embodiment is particularly suitable for use in connection with the supply of current to a manually operated electric tool in order to reduce the risk of electric shock to the operator. It is not always suitable for use in connection with the supply of current to a high-voltage discharge lamp since such circuits normally include a time switch and most time switches are designed to produce permanent closing of contacts and not the temporary closure of the switch 19 which is necessary to initiate operation of this embodiment of the invention.

Figure 3:
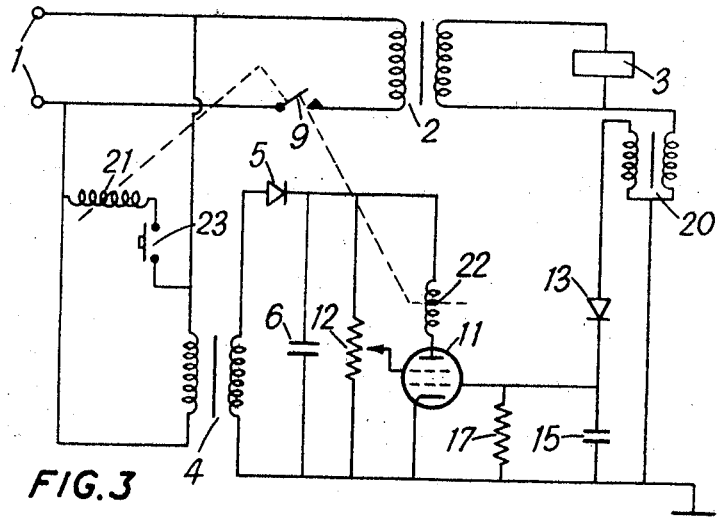
FIG. 3 is a schematic diagram of yet another embodiment of the invention in which a transformer responsive to leakage current and a bi-stable relay are provided.

In the circuit arrangement illustrated in FIG. 3 the reactive impedance means consists of a transformer 20 having one end of its primary winding connected to the secondary winding of the transformer 2 and the other end of its primary winding connected to earth. One end of the secondary winding of the transformer 20 is connected to earth and the other end is connected through a rectifier 13 to the control grid of the screen grid valve 11. Again, the screen grid of the valve is connected to the slider of the potentiometer 12 and a resistor 17 and a capacitor 15 are connected in parallel between the control grid and earth. In this embodiment the relay is a special bi-stable relay having an alternating-current energising coil 21 which places the relay in one stable state after a brief excitation and a direct-current energising coil 22 which when energised serves to change the relay to its other stable state. The relay has a single pair of contacts which are closed when the relay is in its first stable state and open when the relay is in its second stable state. In operation the alternating current coil 21 is briefly energised by means of a push button 23 so that the relay changes to its first stable state in which the primary winding of the transformer 2 is connected to the supply 1. The potentiometer 12 and the remaining components associated with the thermionic valve 11 are arranged so that in the absence of earth leakage current the current through the valve 11 and hence through the direct current energising coil 22 is just not sufficient to change the relay back to the second stable state. However, if earth leakage occurs an alternating potential will appear across the secondary winding of the transformer 20 and this will be rectified by the rectifier 13 to provide a positive potential on the control grid of the valve 11. Thus, the current through the valve will increase and the current through the energising coil 22 will be sufficient to change the relay over to its second stable state in which the contacts 9 are open. The relay will remain in this state until it is restored by further actuation of the push buttom 23.

Figure 4:
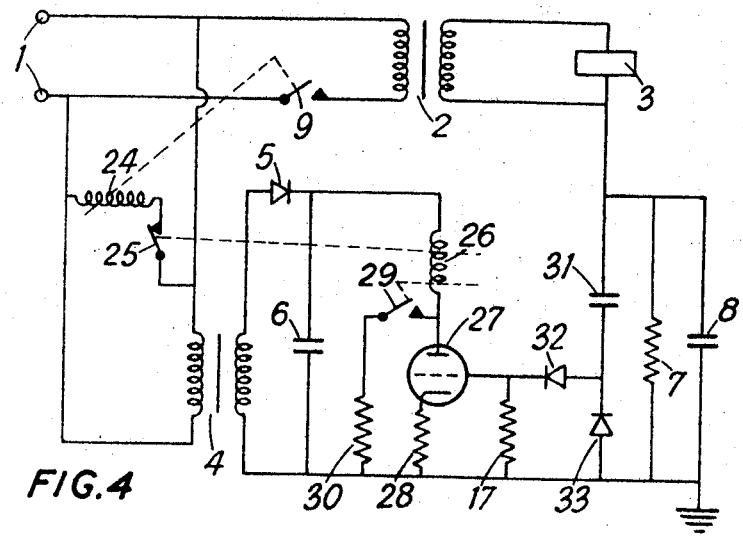
FIG. 4 is a schematic diagram of a further embodiment of the invention which uses two separate relays.

FIG. 4 illustrates a modification of the circuit arrangement illustrated in FIG. 3 in which the bi-stable relay is replaced by two separate relays, one adapted to be energised by alternating current and the other adapted to be energised by direct current. The operating coil 24 of the alternating-current relay is connected to the mains supply 1 through a pair of normally closed contacts 25 of the direct-current relay. The alternating current relay has a single pair of normally open contacts 9 connected in the mains supply to the primary winding of the transformer 2. The energising coil 26 of the direct-current relay is connected in the anode circuit of a triode thermionic valve 27 the cathode of which is connected to earth through the resistor 28. The direct-current relay is provided with a pair of normally open contacts 29 which serve to connect the lower end of the energising coil 26 to earth through a resistor 30.

The impedance means again comprise a resistor 7 and a capacitor 8 and any alternating potential developed across the impedance means is applied through a coupling capacitor 31 to a pair of rectifiers 32 and 33 arranged to supply a positive potential to the control grid of the valve 27 across the resistor 17.

When the mains supply is switched on, the alternating-current relay operates and closes the primary circuit of the transformer 2, thus supplying current to the load 3. The circuit of the valve 27 is arranged so that under normal operating conditions the direct-current relay is not operated. However, if an earth fault occurs on the secondary side of the transformer 2, a positive voltage is applied to the control grid of the valve 27 to increase the anode current of the valve and thus to operate the direct-current relay. Consequently, the contacts 25 are opened and the energising coil 24 of the alternating-current relay is disconnected from the main supply. Thus, the contacts 9 are opened and the supply to the load is interrupted. When the direct-current relay operates, the contacts 29 are closed, with the result that the direct-current relay is held operated by means of current flowing through the energising coil 26 and the resistor 30. If the mains supply is switched off, the direct-current relay releases and accordingly, when the mains supply is switched on again, the alternating-current relay will operate and the cycle of events will be repeated, unless the earth fault has been cleared.

Figure 5:
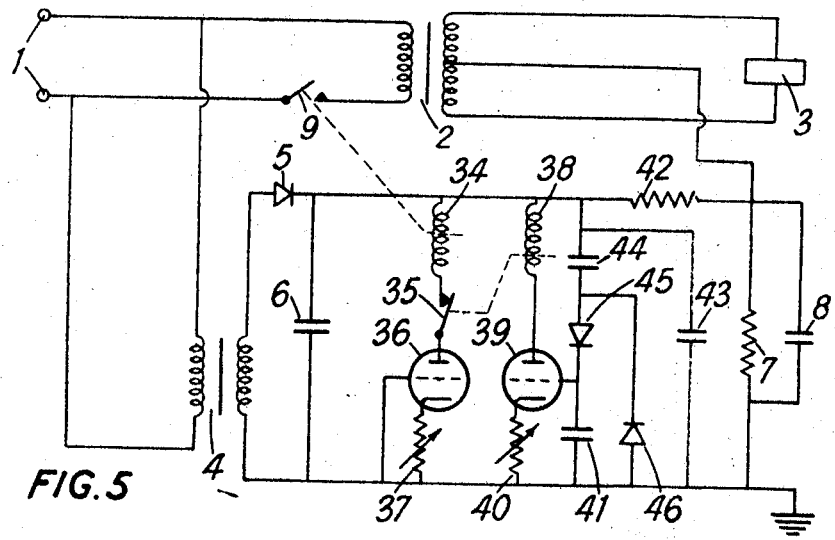
FIG. 5 is a schematic diagram of an embodiment of the invention in which two direct current relays are provided.

In the circuit arrangement illustrated in FIG. 5 the transformer 2 is illustrated with a centre-tapped secondary, the centre point being connected to earth through the resistor 7 and the capacitor 8. Two direct-current relays are used in this embodiment, the first of which has its energising coil 34 connected in series with the normally closed contacts 35 of the second relay in the anode circuit of a triode 36. The cathode of the triode 36 is connected to earth through a variable resistor 37 and the grid of this valve is connected directly to earth. The energising coil 38 of the second relay is connected in the anode circuit of a further triode 39 having its cathode connected to earth through a variable resistor 40. The grid of the triode 39 is connected to earth through a capacitor 41 and to the centre point of the secondary winding of the transformer 2 through filtering and rectifying circuits. The filter circuit consists of a resistor 42 and capacitors 43 and 44 while the rectifying circuit consists of rectifiers 45 and 46.

The cathode resistor 37 is adjusted so that the first relay operates and closes the normally open contacts 9 when the mains supply is switched on. The cathode resistor 40 is adjusted so that the second relay just does not operate when the grid of the valve 39 is at earth potential. If earth leakage occurs, a positive voltage is applied to the grid of the valve 39 and the second relay operates opening its normally closed contacts 36 and thus de-energising the operating coil 34 of the first relay. When the supply is disconnected from the load 3 by the opening of the contacts 9 of the first relay, the voltage across the capacitor 41 commences to decay and after a time delay the current through the energising coil 38 of the second relay will drop below the maintaining value so that the contacts 35 will reclose and re-energise the operating coil 34 of the first relay. Thus, this embodiment of the invention will operate in a somewhat similar manner to the circuit arrangement illustrated in FIG. 1.

Preferably, the two valves 36 and 39 are the two halves of a double triode arranged in a single envelope with series heaters so that failure of either valve prevents the other from working.

Figure 6:
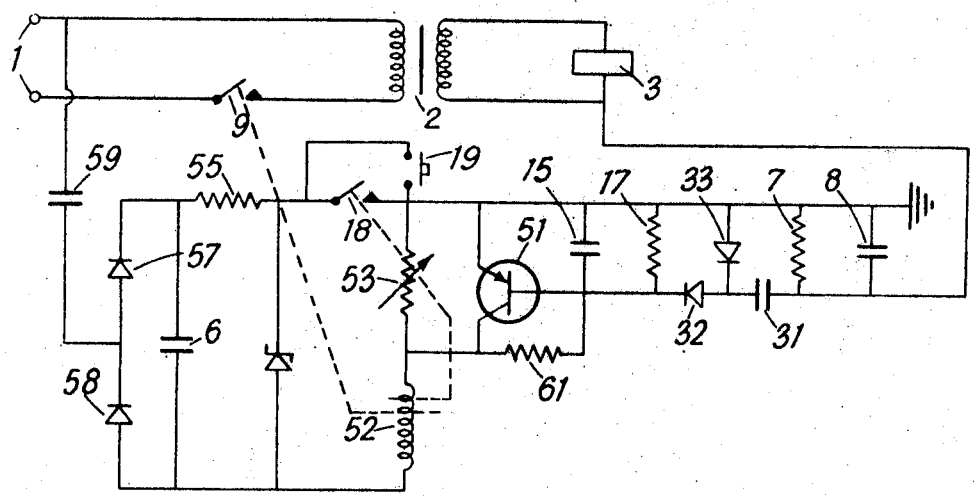
FIG. 6 is a schematic diagram of an embodiment of the invention which uses a transistor in place of a thermionic valve as an amplifying means.
Figure 7:
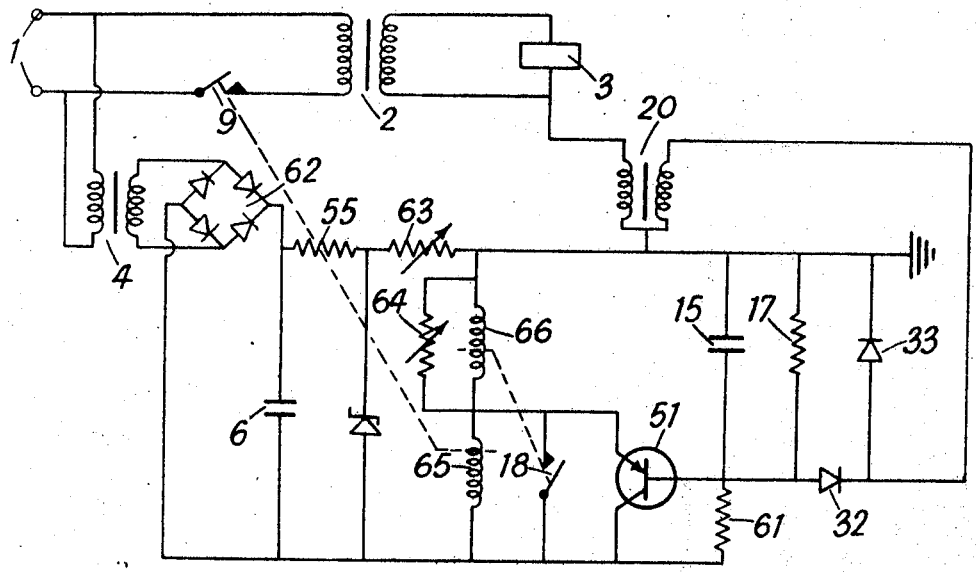
FIG. 7 is a schematic diagram of an additional embodiment of the invention which uses a transistor or an amplifying means.

The embodiments of the invention illustrated in FIGS. 6 and 7 differ from the embodiments herein before described in that the amplifying means comprise a transistor instead of a thermionic valve. Normally, transistors would be less suitable for use in the present invention than thermionic valves because of the temperature dependence of their operating characteristics. However, it has been found possible to obtain satisfactory and reliable operation by using a power supply that produces a voltage considerably above the normal operating voltage and stabilising the power supply by means of a Zener diode. Other forms of stabilisation could be used in place of the Zener diode, for example, a gas-filled diode or a conventional transistor stabilising circuit. In the absence of the Zener diode or other stabilising device the supply produces about 60 volts and this is reduced to 40 volts by the Zener diode.

In the embodiment illustrated in FIG. 6, the power supply for the transistor is somewhat unconventional in that no mains transformer is used. The required voltage is derived from the mains by means of a coupling capacitor 59 connected to the junction between two rectifiers 57 and 58. The normal reservoir capacitor 6 is connected across the two rectifiers and a Zener diode 54 is connected across the capacitor 6 in series with a resistor 55. The relay has normally open contacts 9 in the primary circuit of the transformer 2 and also a further pair of normally open contacts 18. The relay coil 52 is connected in series with a variable resistor 53 to the power supply in series with the contacts 18. A push-button switch 19 is connected in parallel with the contacts 18 so that the relay may be closed by actuation of the push-button.

The reactive impedance means consist of a resistor 7 and a capacitor 8 as in the embodiment described with reference to FIG. 1. Any voltage developed across the resistor 7 is fed through a capacitor 31 to a pair of rectifiers 32 and 33 which serve to derive a positve voltage across a resistor 17 connected in parallel with a capacitor 15. The emitter of a transistor 51 is connected to one end of the variable resistor 53, which is also connected to earth. The collector of the transistor is connected to the junction between the variable resistor 53 and the operating coil 52. The base electrode of the transistor is connected to the junction between the rectifier 32 and the resistor 17 and a bias resistor 61 is connected between the collector and the base electrode of the transistor.

The operating conditions are arranged so that the transistor 51 is conductive in the absence of leakage current. Thus, when the push-button 19 is actuated, current flows from the power supply through the emitter-collector path of the transistor 51 and the operating coil 52 of the relay. The resistor 53, which is in parallel with the emitter-collector path of the transistor, is adjusted so that this current is just sufficient to operate the relay. As a result, the contacts 9 and 18 are closed and the relay is held. If the leakage current exceeds a predetermined value, a control current will be fed to the base electrode of the transistor, causing the transistor to cease to conduct. As a result, the relay 52 will release and the contacts 18 and 9 will be opened. The relay will remain in the de-energised condition until the push-button 19 is re-actuated.

The embodiment of the invention illustrated in FIG. 7 differs from the arrangement illustrated in FIG. 6 primarily in that it includes two relays instead of one. This embodiment is also shown as including a more conventional power supply that that used in FIG. 6 and in this case the impedance means are shown as a transformer 20, as in the case of the arrangement illustrated in FIG. 3.

The power supply used includes the normal transformer 4 and a bridge rectifier 62 feeding a reservoir capacitor 6. As in the case of FIG. 6 a Zener diode 54 is connected in series with a resistor 55 across the capacitor 6. The coils of the two relays 65 and 66 are connected across the Zener diode 54 in series with a variable resistor 63. A variable resistor 64 is connected in parallel with the energising coil of the relay 66 and the normally-open contacts 18 of the relay 66 and the emitter-collector path of the transistor 51 are connected in parallel with the energising coil of the relay 65. The output from the secondary of the earth leakage transformer 20 is rectified by means of the rectifiers 32 and 33 to produce a negative voltage across the capacitor 15 and the resistor 17.

In use, the resistors 63 and 64 are adjusted so that in the absence of earth leakage currents the relay 65 operates but the relay 66 remains unoperated. Accordingly, the contact 9 closes but the contact 18 remains open. When earth leakage current occurs, a negative current is applied to the base of the transistor 51, increasing the conductivity of the transistor to such an extent that the relay 66 operates and closes the contacts 18. As a result, the coil of the relay 65 is shorted and accordingly this relay is deenergised, opening the contacts 9 and disconnecting the load 3 from the power supply. In addition, closure of the contacts 18 holds the relay 66 operated so that power cannot be re-applied to the load 3 without first switching off the mains supply 1.

Figure 8:
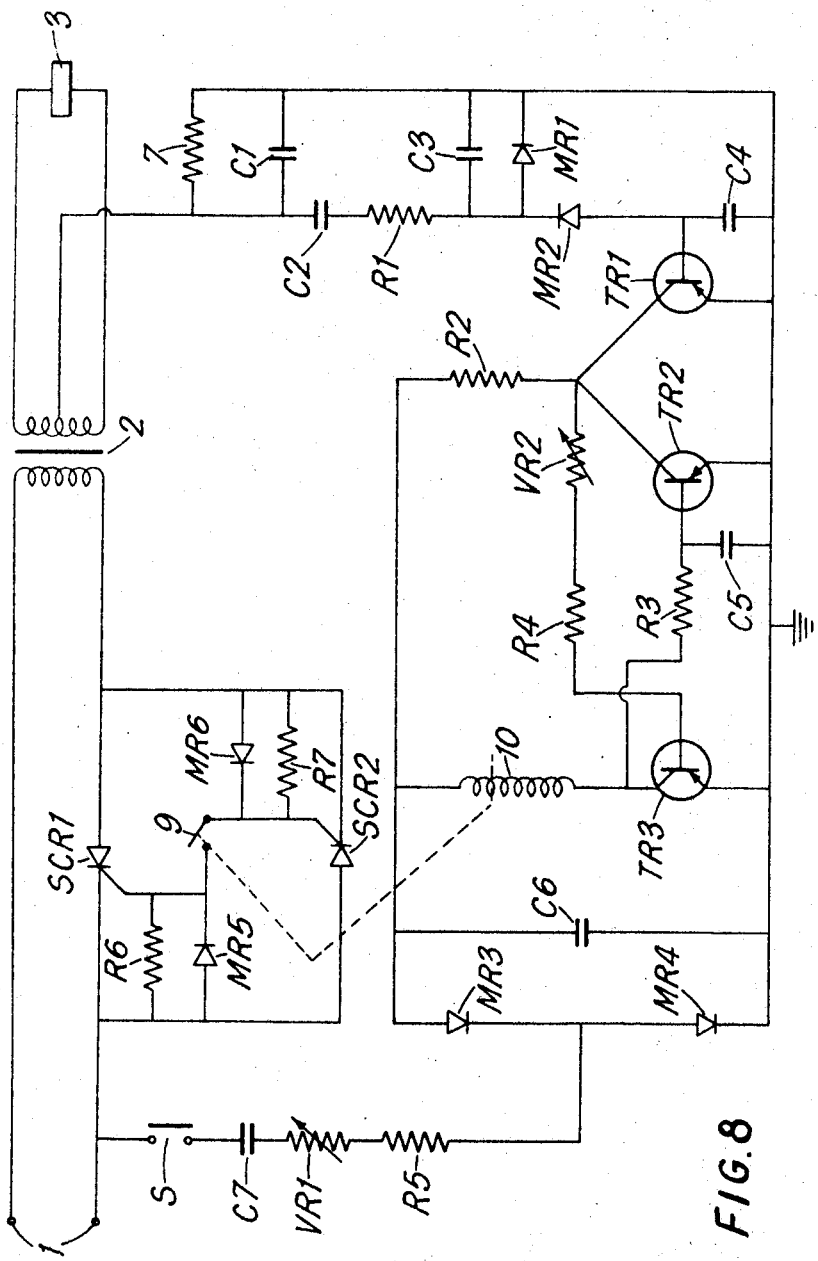
FIG. 8 is a schematic diagram of a preferred embodiment of the invention which uses a bi-stable trigger circuit.

In the circuit arrangement illustrated in FIG. 8, a resistor 7 is connected between a centre tap on the secondary winding of the transformer 2 and earth, and a capacitor C1 is connected in parallel with the resistor 7. Any alternating voltage developed across the resistor 7 is coupled through a capacitor C2 to a filter section consisting of a resistor R1 and a capacitor C3. The components C1, R1 and C3 effectively form a filter which serves to increase the sensitivity of the circuit to mains frequencies. The voltage across the capacitor C3 is rectified by means of a pair of rectifiers MR1 and MR2, and if any earth leakage occurs a voltage appears across a capacitor C4. This capacitor is connected between the base electrode and the emitter of a transistor TR1, the collector of which is connected through a resistor R2 to a reservoir capacitor 6.

A steady voltage is maintained across the capacitor C6 by means of a pair of rectifiers MR3 and MR4, the junction between which is connected through a resistor R5, a variable resistor VR1, a capacitor C7 and a switch S to the live terminal of the mains supply 1.

A pair of transistors TR2 and TR3 are connected in a conventional bi-stable trigger circuit, the collector of the transistor TR3 being coupled to the base electrode of the transistor TR2 through a resistor R3, and the collector of the transistor TR2 being coupled to the base electrode of the transistor TR3 through a resistor R4 and a variable resistor VR2. The collector load of the transistor TR2 is constituted by the resistor R2 which is also in the collector circuit of the transistor TR1, while the collector load of the transistor TR3 is constituted by the energising coil 10 of a reed relay. Contacts 9 of the reed relay control a pair of silicon controlled rectifiers SCR1 and SCR2 which are connected between the live terminal of the mains supply 1 and one end of the primary winding of the transformer 2, each of the contacts 9 being connected to the gate electrode of a respective one of the controlled rectifiers. A resistor R6 and a rectifier MR5 are connected between the gate electrode and the cathode of the rectifier SCR1. Similarly a resistor R7 and a rectifier MR6 are connected between the gate electrode and the cathode of the rectifier SCR2.

If the reed contacts 9 are open, no triggering potential is applied to the gate electrode of either of the controlled rectifiers SCR1 and SCR2, and accordingly both of the rectifiers are non-conductive and the supply to the primary winding of the transformer 2 is interrupted. However, if the contacts are closed, a triggering potential of the correct polarity is applied to the gate electrode of the rectifier SCR1 through the resistor R7 during one half-cycle of the supply voltage and a triggering potential is applied to the gate electrode of the rectifier SCR2 through the resistor R6 during the other half-cycle. Thus each controlled rectifier conducts during one half-cycle and the supply to the primary winding of the transformer 2 is maintained.

A capacitor C5 is connected between the base electrode of the transistor TR2 and earth and this capacitor ensures that, when the mains supply is initially connected to the terminals 1 and the switch S is closed, more current flows to the base electrode of the transistor TR3 than to the base electrode of the transistor TR2, so that the bi-stable circuit initially assumes the state in which the transistor TR3 is conductive. If, however, the base current of the transistor TR3 is reduced, the collector voltage of TR3 will increase and more current will flow to the base electrode of the transistor TR2. As a result, the bi-stable trigger circuit will change over to the state in which the transistor TR2 is conductive in place of the transistor TR3. This reduction in the base current of the transistor TR3 will be brought about if a sufficient alternating voltage is developed across the resistor 7 and the capacitor 8 as a result of earth leakage on the secondary side of the transformer 2. Any such voltage is rectified and increases the base current of the transistor TR1 so that its collector voltage is decreased and less current is available to flow through the resistor R2 to the base electrode of the transistor TR3. Thus any earth leakage causes the bi-stable trigger circuit to change over and, when the transistor TR3 ceases to conduct, the reed relay releases and opens its contacts 9. Consequently the silicon controlled resistors SCR1 and SCR2 become non-conductive and the primary circuit of the transformer 2 is interrupted. Interruption of the supply to the transformer causes the alternating potential across the resistor 7 to disappear and the transistor TR1 again becomes non-conductive. However, since the trigger circuit is bi-stable, it does not revert to the state in which TR3 is conductive, but maintains the primary circuit of the transformer open until the mains are switched off, and the earth fault has been cleared. If the mains are re-connected after the earth fault has been cleared, the capacitor C5 connected between the base and emitter electrodes of the transistor TR2 will ensure that the current flows initially through the transistor TR3 and not through the transistor TR2.

In most cases it will be found that lack of balance in the secondary circuit of the transformer 2 will cause a small voltage to be developed across the resistor 7 even when there is no fault in the system. Accordingly the variable resistor VR2 is provided to enable the sensitivity of the trigger circuit to be decreased to the extent necessary to ensure that it will not be changed over solely by such out-of-balance conditions.

It is to be understood that the primary windings of further transformers may be connected in parallel with the primary winding of the transformer 2 provided the total current required does not overload the silicon controlled rectifiers SCR1 and SCR2. In this case a separate resistor 7 is preferably provided between the centre tap of each secondary winding and earth, and all the centre taps are connected in parallel to the junction between the capacitors C1 and C2. In this case any earth leakage on the secondary side of any of the transformers will disconnect the mains from all the primary circuits.

It is further to be understood that only certain combinations of the various features of the invention have been illustrated and that the features of one embodiment can in many cases be incorporated in one or more of the other embodiments. For example, the transformer 20 could be provided in any of the circuit arrangements illustrated in FIGS. 1, 2, 4 and 5 in place of the resistor 7 and the capacitor 8. Similarly, the filter circuit illustrated in FIG. 5, which is tuned to make the circuit as sensitive as possible to the mains frequency and as immune as possible to higher frequencies, may be provided in the circuit arrangements illustrated in any of the FIGS. 1 to 4.

If desired, a warning light, buzzer of other device may be provided to give an audible or visible warning when earth leakage occurs. For this purpose, change-over contacts may be provided in place of the normally-open contacts 9.

What I claim is:

1. A circuit arrangement including a load connected to the secondary winding of a transformer, reactive impedance means connected between said secondary winding and earth, means for rectifying any voltage developed across said impedance means as a result of earth current from the secondary circuit of said transformer, a relay having contacts which control the supply to the primary circuit of said transformer, and a bi-stable device incorporating at least one transistor and connected to control current through an energising coil of said relay, said bistable device being controlled by the output of said rectifying means so that said relay interrupts the supply to said primary circuit when the leakage current exceeds a predetermined value.

2. A circuit arrangement as claimed in claim 1, wherein the relay interrupts said supply only if the leakage current exceeds the predetermined value for a predetermined period of time.

3. A circuit arrangement as claimed in claim 1, wherein the impedance means comprises a resistive element and a capacitive element connected in parallel between the secondary winding and earth.

4. A circuit arrangement as claimed in claim 1, wherein the relay contacts are normally open and the relay is energised to close the contacts so long as the leakage current is below the predetermined value.

5. A circuit arrangement as claimed in claim 4, wherein the relay energising current is supplied by amplifying means controlled by an electrical quantity whose magnitude depends on the value of the leakage current.

6. A circuit arrangement as claimed in claim 1, wherein a filter circuit is provided to decrease the sensitivity of the bi-stable device to frequencies other than the mains frequency.

7. A circuit arrangement as claimed in claim 1, wherein said bi-stable device includes a pair of transistors each having its collector electrode connected through a respective resistive element to the base electrode of the other transistor, and wherein the energising coil of the relay is connected in the collector circuit of one of said transistors.

8. A circuit arrangement as claimed in claim 1, wherein the bi-stable device is controlled by amplifying means, and wherein means are provided for applying to the input of said amplifying means an electrical quantity the magnitude of which depends on the value of the leakage current.

9. A circuit arrangement as claimed in claim 1, including means for ensuring that, when current is initially supplied to said circuit arrangement, the bi-stable device automatically assumes a predetermined one of its two stable states in which the contacts of said relay are closed.

10. A circuit arrangement as claimed in claim 1, wherein the contacts of said relay control a pair of silicon controlled rectifiers in the primary circuit of the transformer.

11. A circuit arrangement as claimed in claim 1, wherein the impedance means comprises a resistive element and a capacitive element connected in parallel between a centre tap of the secondary winding of the transformer and earth, wherein a filter circuit is provided to decrease the sensitivity of the circuit to frequencies other than the mains frequency, and wherein the power supply for the bi-stable device is derived from the mains supply by means of a capacitor coupled to the junction between a pair of rectifiers connected in series across a reservoir capacitor.

12. A circuit arrangement including a load connected to the secondary winding of a transformer, reactive impedance means connected between said secondary winding and earth, means for rectifying any voltage developed across said impedance means as a result of earth current from the secondary circuit of said transformer, a relay having contacts which control the supply to the primary circuit of said transformer, and a bi-stable device incorporating at least one active element and connected to control current through an energising coil of said relay, said bi-stable device being controlled by the output of said rectifying means so that said relay interrupts the supply to said primary circuit when the leakage current exceeds a predetermined value.

13. A circuit as claimed in claim 12, wherein said relay interrupts said supply only if the leakage current exceeds the predetermined value for a predetermined time.

14. A circuit as claimed in claim 12, wherein the impedance means comprises a resistive element and a capacitive element connected in parallel between the secondary winding and earth.

15. A circuit as claimed in claim 12, wherein the relay contacts are normally open and the relay is energised to close the contacts so long as the leakage current is below the predetermined value.

16. A circuit as claimed in claim 15, wherein the relay energising current is supplied by amplifying means controlled by an electrical quantity whose magnitude depends on the value of leakage current.

17. A circuit arrangement as claimed in claim 12, wherein a filter circuit is provided to decrease the sensitivity of the bi-stable device to frequencies other than the mains frequency.

18. A circuit arrangement as claimed in claim 12, wherein the bi-stable device is controlled by amplifying means, and means are provided for applying to the input of said amplifying means an electrical quantity the magnitude of which depends on leakage current.

19. A circuit arrangement as claimed in claim 12, including means for ensuring that, when current is initially supplied to said circuit arrangement, the bi-stable device automatically assumes a predetermined one of its two stable states in which the contacts of said relay are closed.

20. A circuit arrangement as claimed in claim 12, wherein the contacts of said relay control a pair of silicon controlled rectifiers in the primary circuit of the transformer.

21. A circuit arrangement as claimed in claim 12, wherein the impedance means comprises a resistive element and a capacitive element connected in parallel between a centre tap of the secondary winding of the transformer and earth, wherein a filter circuit is provided to decrease the sensitivity of the circuit to frequencies other than the mains frequency, and wherein the power supply for the bi-stable device is derived from the mains supply by means of a capacitor coupled to the junction between a pair of rectifiers connected in series across a reservoir capacitor.

References Cited

UNITED STATES PATENTS

| 2,027,209 | 1/1936 | Starr | 317—18 |
| 3,168,682 | 2/1965 | Moore et al. | 317—18 |
| 3,287,636 | 11/1966 | Gagniere | 317—18 X |

FOREIGN PATENTS

| 446,299 | 4/1936 | Great Britain. |

OTHER REFERENCES

GE Silicon Controlled Rectifier Manual, "AC Static Switch," 2nd Edition, Sec. 7.2, pp. 89, 90, December 1961.

J D MILLER, Primary Examiner

W. H. BEHA, Jr., Assistant Examiner

U.S. Cl. X.R.

317—142